(12) United States Patent
Zähe

(10) Patent No.: US 11,353,127 B2
(45) Date of Patent: Jun. 7, 2022

(54) VENTED COUNTERBALANCE VALVE WITH TWO SETTING SPRINGS IN PARALLEL

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 232 days.

(21) Appl. No.: 16/860,227

(22) Filed: Apr. 28, 2020

(65) Prior Publication Data

US 2021/0332899 A1  Oct. 28, 2021

(51) Int. Cl.

| F16K 17/04 | (2006.01) |
|---|---|
| F16K 17/06 | (2006.01) |
| F15B 13/02 | (2006.01) |
| F15B 11/08 | (2006.01) |
| F15B 11/044 | (2006.01) |

(52) U.S. Cl.
CPC ............ *F16K 17/044* (2013.01); *F15B 11/08* (2013.01); *F15B 13/029* (2013.01); *F16K 17/048* (2013.01); *F16K 17/06* (2013.01); *F15B 11/0445* (2013.01); *F15B 2211/50581* (2013.01); *F15B 2211/528* (2013.01)

(58) Field of Classification Search
CPC ..... F15B 11/003; F15B 11/08; F15B 11/0445; F15B 13/029; F15B 13/0402; F15B 17/044; F15B 17/048; F15B 17/06; F15B 2211/50581; F15B 2211/528; F15B 2211/5059; F16K 17/06; F16K 17/10; F16K 31/1221; F16K 17/044; Y10T 137/777; Y10T 137/7781

USPC ............................................... 137/492.5, 494
See application file for complete search history.

(56) References Cited

U.S. PATENT DOCUMENTS

| 4,577,831 A * | 3/1986 | DiBartolo | ........... F16K 37/0016 |
| | | | 251/114 |
| 4,630,640 A * | 12/1986 | DiBartolo | .............. G05D 7/014 |
| | | | 137/501 |
| 4,742,846 A * | 5/1988 | DiBartolo | ............. F16K 17/065 |
| | | | 137/469 |
| 4,834,135 A * | 5/1989 | DiBartolo | ............. F16K 17/065 |
| | | | 251/282 |

(Continued)

OTHER PUBLICATIONS

Ex Parte Quayle Action issued by the U.S Patent Office in U.S. Appl. No. 16/860,229 dated Jan. 27, 2022.

*Primary Examiner* — William M Mccalister
(74) *Attorney, Agent, or Firm* — McDonnell Boehnen Hulbert & Berghoff LLP

(57) ABSTRACT

An example counterbalance valve includes: a poppet configured to be subjected to a fluid force by fluid received at a first port, and a fluid force by a pilot pressure fluid signal received at a pilot port; a first setting spring disposed in a first chamber and applying a first biasing force on the poppet; and a second setting spring disposed in a second chamber and applying a second biasing force on the poppet, wherein the first chamber and the second chamber are vented to an external environment of the counterbalance valve, wherein the second setting spring is in parallel with the first setting spring such that an equivalent biasing force acting on the poppet in the distal direction comprises a sum of the first biasing force and the second biasing force.

20 Claims, 5 Drawing Sheets

(56) References Cited

U.S. PATENT DOCUMENTS

| | | | | |
|---|---|---|---|---|
| 4,836,240 | A | * | 6/1989 | Elliott ............... F16K 17/06 137/493 |
| 4,873,817 | A | * | 10/1989 | Harms ............. F16K 17/105 251/30.02 |
| 5,381,823 | A | * | 1/1995 | DiBartolo ......... F16K 17/065 137/494 |
| 6,039,070 | A | * | 3/2000 | Zaehe ............. F16K 17/105 137/491 |
| 6,640,830 | B2 | | 11/2003 | Zähe |
| 10,428,845 | B1 | * | 10/2019 | Bianchi ............ F15B 11/0445 |
| 10,626,892 | B1 | | 4/2020 | Zähe |
| 2003/0106588 | A1 | * | 6/2003 | Zahe ................. F16K 17/10 137/491 |
| 2006/0201554 | A1 | * | 9/2006 | Prinsen ........... F16K 17/0433 137/491 |
| 2019/0301495 | A1 | * | 10/2019 | Bianchi ............ F15B 11/0445 |

\* cited by examiner

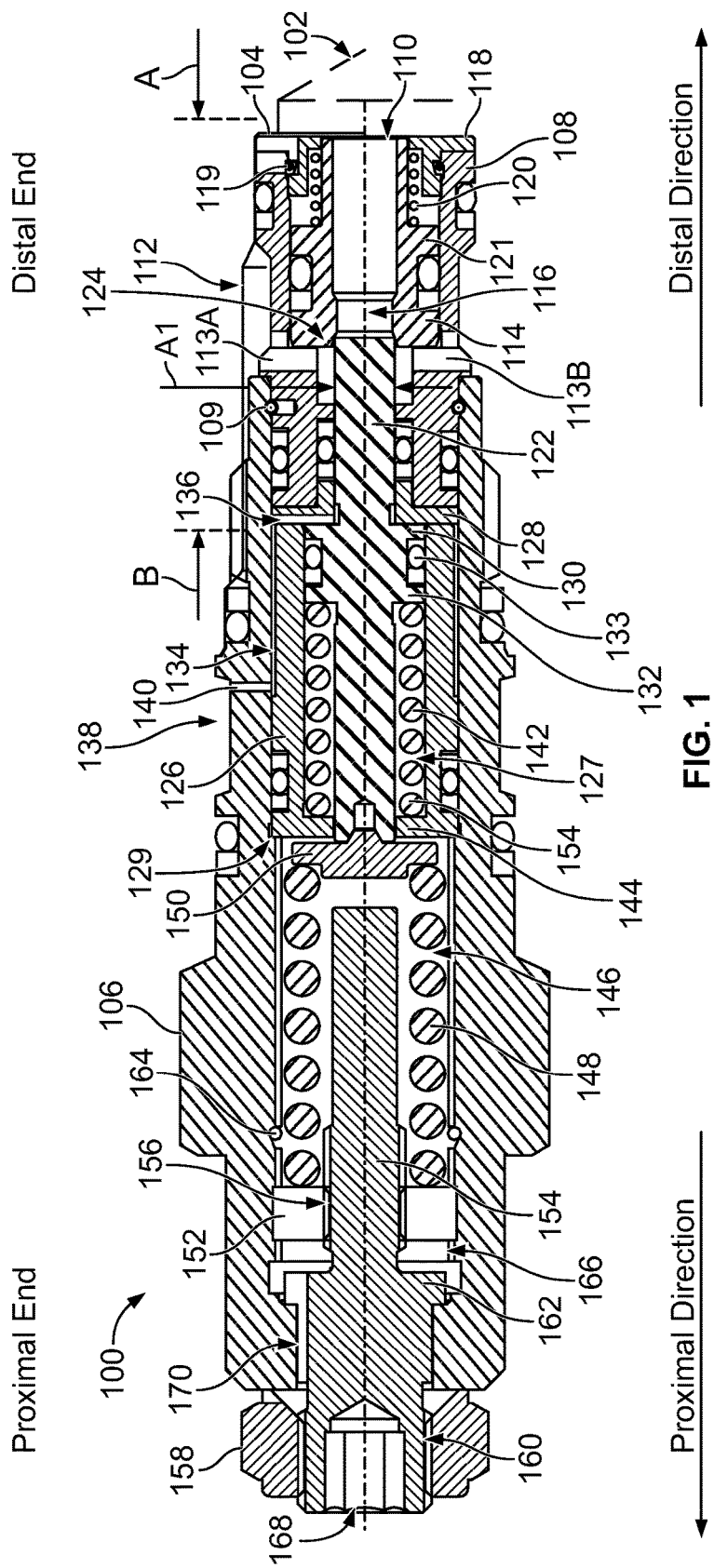
FIG. 1
FIG. 2
FIG. 3

VENTED COUNTERBALANCE VALVE WITH TWO SETTING SPRINGS IN PARALLEL

BACKGROUND

Counterbalance valves are hydraulic valves configured to hold and control negative or gravitational loads. They may be configured to operate, for example, in applications that involve the control of suspended loads, such as mechanical joints, lifting applications, extensible movable bridge, winches, etc.

In some applications, the counterbalance valve, which may also be referred to as an overcenter valve, could be used as a safety device that prevents an actuator from moving if a failure occurs (e.g., a hose burst). In other applications, it could be used as a load holding valve (e.g., on a boom cylinder of a mobile machinery). The counterbalance valve allows cavitation-free load-lowering, preventing the actuator from overrunning when pulled by the load (gravitational load).

As an example, a counterbalance valve could be used on the return side of a hydraulic actuator for lowering a large negative load in a controlled manner. The counterbalance valve generates a preload or back-pressure in the return line that acts against the main drive pressure so as to maintain a positive load, which therefore remains controllable. Particularly, if a speed of a piston of the cylinder increases, pressure on one side of the cylinder (e.g., rod side) may drop and the counterbalance valve may then act to restrict the flow to controllably lower the load.

A pilot-operated counterbalance valve can be opened by combined action of a pilot pressurize signal in a pressurized pilot line and load pressure. To protect both directions of motion of a fluid receiving device against a negative load, a respective counterbalance valve may be assigned to each of the ports of the fluid receiving device. Each counterbalance valve assigned to a particular port may then be controlled open via cross-over by the pressure present at the other port. In other words, a respective pressurized pilot line that, when pressurized, opens a counterbalance valve is connected to a supply line connected to the other port.

SUMMARY

The present disclosure describes implementations that relate to a vented counterbalance valve with two setting springs in parallel.

In a first example implementation, the present disclosure describes a counterbalance valve. The counterbalance valve includes: (i) a plurality of ports comprising: a first port configured to be fluidly coupled to an actuator, a second port, and a pilot port configured to receive a pilot pressure fluid signal; (ii) a poppet configured to be subjected to (a) a first fluid force by fluid received at the first port acting on the poppet in a proximal direction, and (b) a second fluid force by the pilot pressure fluid signal received at the pilot port acting on the poppet in the proximal direction; (iii) a first setting spring disposed in a first chamber and applying a first biasing force on the poppet in a distal direction; and (iv) a second setting spring disposed in a second chamber and applying a second biasing force on the poppet in the distal direction, wherein the first chamber and the second chamber are vented to an external environment of the counterbalance valve, wherein the second setting spring is in parallel with the first setting spring such that an equivalent biasing force acting on the poppet in the distal direction comprises substantially a sum of the first biasing force and the second biasing force, and wherein the poppet is configured to move to an axial position based on a substantial force equilibrium between the first fluid force, the second fluid force, and the equivalent biasing force to allow fluid flow from the first port to the second port.

In a second example implementation, the present disclosure describes a hydraulic system. The hydraulic system includes: a source of fluid; a fluid reservoir; an actuator having a first actuator chamber and a second actuator chamber; a directional control valve configured to direct fluid flow from the source of fluid to the second actuator chamber via a fluid line; and a counterbalance valve having a first port fluidly coupled to the second actuator chamber, a second port fluidly coupled to the fluid reservoir, and a pilot port fluidly coupled to the fluid line and configured to receive a pilot pressure fluid signal therethrough. The counterbalance valve comprises: (i) a poppet configured to be subjected to (a) a first fluid force by fluid received at the first port acting on the poppet in a proximal direction, and (b) a second fluid force by the pilot pressure fluid signal received at the pilot port acting on the poppet in the proximal direction; (ii) a first setting spring disposed in a first chamber and applying a first biasing force on the poppet in a distal direction; and (iii) a second setting spring disposed in a second chamber and applying a second biasing force on the poppet in the distal direction, wherein the first chamber and the second chamber are vented to an external environment of the counterbalance valve, wherein the second setting spring is in parallel with the first setting spring such that an equivalent biasing force acting on the poppet in the distal direction comprises substantially a sum of the first biasing force and the second biasing force, and wherein the poppet is configured to move to an axial position based on a substantial force equilibrium between the first fluid force, the second fluid force, and the equivalent biasing force to allow fluid flow received at the first port from the second actuator chamber to the second port that is fluidly coupled to the fluid reservoir.

In a third example implementation, the present disclosure describes a method. The method includes: (i) applying a first fluid force on a poppet of a counterbalance valve in a proximal direction, wherein the counterbalance valve comprises a first port fluidly coupled to a chamber of an actuator, a second port, and a pilot port, and wherein the first fluid force is applied by fluid received at the first port from the chamber of the actuator; (ii) applying a second fluid force on the poppet of the counterbalance valve in the proximal direction by a pilot pressure fluid signal received at the pilot port; (iii) applying a first biasing force on the poppet in a distal direction by a first setting spring disposed in a first chamber within a housing of the counterbalance valve; and (iv) applying a second biasing force on the poppet in the distal direction by a second setting spring disposed in a second chamber within the housing of the counterbalance valve, wherein the first chamber and the second chamber are vented to an external environment of the counterbalance valve, wherein the second setting spring is in parallel with the first setting spring such that an equivalent biasing force acting on the poppet in the distal direction comprises substantially a sum of the first biasing force and the second biasing force, and wherein an axial position of the poppet is based on a substantial force equilibrium between the first fluid force, the second fluid force, and the equivalent biasing force.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 1 illustrates a cross-sectional side view of a counterbalance valve, in accordance with an example implementation.

FIG. 2 illustrates a frontal view labelled "A" in FIG. 1, in accordance with an example implementation.

FIG. 3 illustrates a cross-sectional view labelled "B" in FIG. 1, in accordance with an example implementation.

DETAILED DESCRIPTION

Figure 4:
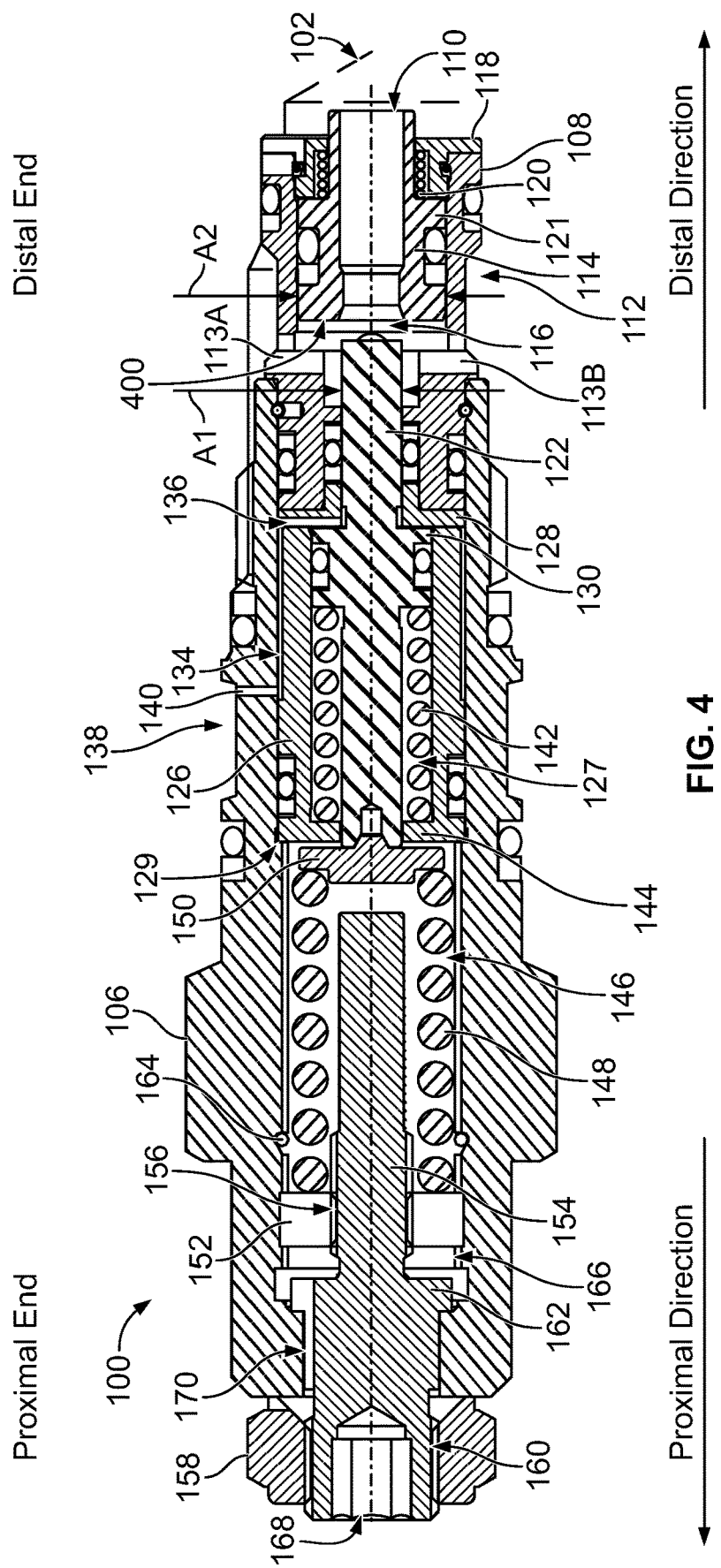
FIG. 4 illustrates a cross-sectional side view of a counterbalance valve operating in a first mode of operation, in accordance with an example implementation.

A counterbalance valve can have a spring that acts against a movable element (e.g., a spool or a poppet), and the force of the spring determines a pressure setting of the counterbalance valve. The pressure setting is a pressure level that causes the counterbalance valve to open and allow fluid flow therethrough. In examples, the counterbalance valve is configured to have a pressure setting that is higher (e.g., 30% higher) than an expected maximum induced pressure in an actuator controlled by the counterbalance valve. The counterbalance valve is configured to open when a combined force resulting from action of load pressure induced in one chamber of the actuator and action of a pilot pressure signal generated at the other chamber of the actuator overcomes the pressure setting of the counterbalance valve.

In some examples, it may be desirable to increase a spring rate of the setting spring to increase the force of the setting spring so as to either increase the pressure setting of the valve, or alternatively maintain the pressure setting of the valve but allow a larger amount of fluid flow rate through the valve for a given size of the valve. A spring rate of a setting spring disposed in a chamber within the valve can be limited by dimensions of the chamber.

It may thus be desirable to have a counterbalance valve with two setting springs in a parallel configuration to increase the spring force. It may also be desirable to have a vented counterbalance valve so as to have a consistent pressure setting that does not change based on backpressure at the outlet port of the counterbalance valve. It is with respect to these and other considerations and features that the disclosure made herein is presented.

FIG. 1 illustrates a cross-sectional side view of a counterbalance valve 100, in accordance with an example implementation. The counterbalance valve 100 may be inserted or screwed into a manifold 102 having ports corresponding to ports of the counterbalance valve 100 described below, and may thus fluidly couple the counterbalance valve 100 to other components of a hydraulic system. The manifold 102 is shown partially with dashed lines in FIG. 1. The manifold 102 can, for example, have a shoulder 104 formed therein to support a distal end of the counterbalance valve 100.

The counterbalance valve 100 includes a housing 106 that defines a longitudinal cylindrical cavity therein. The counterbalance valve 100 also includes a first sleeve 108 received at a distal or first end of the housing 106 and protruding distally outward therefrom. The first sleeve 108 is fixedly disposed (i.e., does not move axially) within the housing 106 via a wire ring 109. The term "fixedly disposed" is used herein to indicate that a component is substantially stationary except for minimal axial "play" (e.g., axial movement allowed by a wire ring moving within a groove).

The first sleeve 108 defines a first port 110 and a second port 112. The first port 110 is defined at a nose or distal end of the first sleeve 108 and can be referred to as a load port, for example. The second port 112 can be referred to be as an exhaust port and can include a set of cross-holes such as cross-holes 113A, 113B. The cross-holes can be disposed in an array (e.g., a radial array) about a wall of the first sleeve 108. The term "cross-hole" indicates a hole that crosses a path of, or is formed transverse relative to, another hole, cavity, or channel.

The first sleeve 108 defines a respective longitudinal cylindrical cavity therein. The counterbalance valve 100 includes a reverse flow piston 114 that is disposed, and slidably accommodated, in the longitudinal cylindrical cavity of the first sleeve 108. The reverse flow piston 114 is referred to as a "reverse flow" piston because it is configured to allow fluid flow from the second port 112 to the first port 110 as described below with respect to FIG. 4. The term "piston" is used herein to encompass any type of movable element, such as a spool-type movable element or a poppet-type movable element.

Further, the term "slidably accommodated" is used throughout herein to indicate that a first component (e.g., the reverse flow piston 114) is positioned relative to a second component (e.g., the first sleeve 108) with sufficient clearance therebetween, enabling movement of the first component relative to the second component in the proximal and distal directions. As such, the first component (e.g., reverse flow piston 114) is not stationary, locked, or fixedly disposed in the counterbalance valve 100, but rather, is allowed to move relative to the second component (e.g., the first sleeve 108).

A main chamber 116 is formed within the first sleeve 108, and the reverse flow piston 114 is hollow such that interior space of the reverse flow piston 114 is comprised in the main chamber 116. The main chamber 116 is fluidly coupled to the first port 110.

The counterbalance valve 100 can include a ring-shaped member 118 (e.g., a nose support piece) fixedly disposed, at least partially, within the first sleeve 108 at a distal end thereof via a wire ring 119. The counterbalance valve 100 also includes a reverse flow check spring 120 disposed about an exterior peripheral surface of the reverse flow piston 114.

The ring-shaped member 118 protrudes radially inward within the cavity of the first sleeve 108 to form a support for a distal end of the reverse flow check spring 120. A proximal end of the reverse flow check spring 120 acts against a flange 121 projecting radially outward from the reverse flow piston 114. With this configuration, the distal end of the reverse flow check spring 120 is fixed, whereas the proximal end of the reverse flow check spring 120 is movable and interfaces with the reverse flow piston 114. This way, the reverse flow check spring 120 biases the reverse flow piston 114 in a proximal direction (e.g., to the left in FIG. 1).

Further, a proximal end of the ring-shaped member 118 acts as a stop for the flange 121 of the reverse flow piston 114 when the reverse flow piston 114 moves in the distal direction. The ring-shaped member 118 further interfaces with the shoulder 104 of the manifold 102 to support the counterbalance valve 100 in the cavity of the manifold 102. Further, the ring-shaped member 118 is configured to facilitate removal of the wire ring 119 to disassemble the counterbalance valve 100.

FIG. 2 illustrates a frontal view labelled "A" in FIG. 1, in accordance with an example implementation. As shown in FIG. 2, the ring-shaped member 118 has a window or slot 200 formed therein. The slot 200 allows an operator to insert a tool via the slot 200 to access and pluck the wire ring 119. Once the wire ring 119 is plucked and removed, the counterbalance valve 100 can be disassembled for repair or maintenance purposes.

Referring back to FIG. 1, the counterbalance valve 100 further includes a poppet 122 disposed, and slidably accommodated, in the cavity of the first sleeve 108. In other words, the poppet 122 is axially-movable within the first sleeve 108. When the counterbalance valve 100 is in a closed position that precludes flow from the first port 110 to the second port 112, the poppet 122 is seated at or on a seat 124 formed by the reverse flow piston 114. The poppet 122 can be referred to as a main piston or spool.

The counterbalance valve 100 can further include a second sleeve 126 fixedly disposed within the longitudinal cylindrical cavity of the housing 106. The second sleeve 126 is disposed axially on a proximal side of the first sleeve 108 and is longitudinally-separated therefrom by a spacer 128. The spacer 128 can be a ring-shaped member that has an L-shaped cross section as depicted in FIG. 1.

With this configuration, the spacer 128 is interposed between the first sleeve 108 and the second sleeve 126. A proximal end of the second sleeve 126 rests against a shoulder 129 formed in the housing 106. As such, the first sleeve 108 and the second sleeve 126, along the spacer 128 interposed therebetween, are fixedly disposed in the housing 106 via the wire ring 109 and the shoulder 129.

As depicted in FIG. 1, the second sleeve 126 includes a first chamber 127 therein, and the poppet 122 extends proximally in the first chamber 127 of the second sleeve 126. As such, the poppet 122 is partially disposed in the first sleeve 108 and partially disposed in the second sleeve 126. Particularly, the poppet 122 can have a first flange 130 and a second flange 132 having an annular groove formed therebetween. Exterior surfaces of the first flange 130 and the second flange 132 interface with the interior surface of the second sleeve 126. A seal 133 is disposed in the annular groove between the flanges 130, 132 to limit leakage between the main chamber 116 and the first chamber 127.

The second sleeve 126 further includes a recess or annular groove 134 formed about the exterior surface of the second sleeve 126. Further, the spacer 128 can have a slot 136 (e.g., a milled slot) that is fluidly coupled to the annular groove 134. The term "fluidly coupled" is used herein to indicate that fluid can flow or be communicated between two fluid passages, chambers, ports, or openings.

FIG. 3 illustrates a cross-sectional view labelled "B" in FIG. 1, in accordance with an example implementation. As shown in FIG. 3, the spacer 128 has the slot 136 formed therein. The slot 136 can receive fluid from the annular groove 134, and the fluid received at the slot 136 can apply a force on the first flange 130 of the poppet 122 in the proximal direction.

Referring back to FIG. 1, the housing 106 further defines a pilot port 138 that can comprise pilot cross-holes such as pilot cross-hole 140 disposed in the housing 106 and configured to communicate a pilot pressure fluid signal received at the pilot port 138 to the annular groove 134, then to the slot 136 of the spacer 128. The pilot pressure fluid signal can thus apply a force on in the proximal direction (e.g., to the left in FIG. 1) on the first flange 130 of the poppet 122 in the proximal direction.

The counterbalance valve 100 further includes a first setting spring 142 disposed about an exterior surface of a proximal portion of the poppet 122. Particularly, the first chamber 127 comprises an annular chamber formed between the exterior surface of the proximal portion of the poppet 122 and an interior surface of the second sleeve 126, and the first setting spring 142 is disposed in the annular chamber. A distal end of the first setting spring 142 rests against the second flange 132 of the poppet 122, whereas a proximal end of the first setting spring 142 rests against a shoulder 144 formed at a proximal end of the second sleeve 126.

With this configuration, the proximal end of the first setting spring 142 is fixed, whereas the distal end of the first setting spring 142 resting against the second flange 132 is movable with the poppet 122 and biases the poppet 122 in the distal direction. As such, the first setting spring 142 applies a biasing force on the poppet 122 in the distal direction toward the seat 124. This way, the poppet 122 can remain seated at the seat 124 when the counterbalance valve 100 is in the closed position.

The counterbalance valve 100 includes a second chamber 146 formed within the housing 106. The second chamber 146 is disposed longitudinally in a proximal direction from the first chamber 127 containing the first setting spring 142.

The counterbalance valve 100 further includes a second setting spring 148 disposed in the second chamber 146. A distal end of the second setting spring 148 rests against a spring cap 150 coupled to the proximal end of the poppet 122, e.g., the spring cap 150 can be screwed to the proximal end of the poppet 122. The counterbalance valve 100 also includes an adjustable nut 152 interfacing with the second setting spring 148, i.e., a proximal end of the second setting spring 148 rests against the adjustable nut 152.

The second setting spring 148 is disposed about an exterior surface of an adjusting pin 154. The adjustable nut 152 is threadedly engaged with the adjusting pin 154 at threaded region 156. The adjusting pin 154 is also threadedly coupled to a nut 158 at threaded region 160, which interfaces with the proximal end of the housing 106, thereby causing the adjusting pin 154 to be coupled to the housing 106. Threads of the threaded region 160 are configured such that the adjusting pin 154 is allowed to rotate, but the adjusting pin 154 does not move axially.

Threads of the threaded region 156, however, are configured such that as the adjusting pin 154 rotates, the adjustable nut 152 moves axially within the second chamber 146 to compress or decompress the second setting spring 148. For example, the threaded region 156 can be configured such that if the adjusting pin 154 rotates in a clockwise direction, the adjustable nut 152 moves in the proximal direction, thereby relaxing or decompressing the second setting spring 148. The adjustable nut 152 can move in the proximal direction until it reaches a shoulder 162 of the adjusting pin 154, which operates as a stop for the adjustable nut 152.

In this example, if the adjusting pin 154 rotates in a counter-clockwise direction, the adjustable nut 152 moves in the distal direction, thereby compressing the second setting spring 148. The adjustable nut 152 can move in the distal direction until it reaches a wire ring 164, which operates as a stop for the adjustable nut 152 in the distal direction. Further, the housing 106 comprises a longitudinal slot 166 that guides and the adjustable nut 152 longitudinally and precludes the adjustable nut 152 from rotating with the adjusting pin 154.

With this configuration, the adjusting pin 154 operates as a set screw where a tool can be inserted into a cavity 168 at the head of the adjusting pin 154 to rotate it and adjust the length of the second setting spring 148. Adjusting the length of the second setting spring 148 changes the biasing force that the second setting spring 148 applies on the spring cap 150, which is also applied to the poppet 122 coupled thereto, in the distal direction. When the second setting spring 148 is compressed (i.e., the adjustable nut 152 moves in the distal direction), the biasing force of the second setting spring 148 increases. On the other hand, when the second setting spring 148 is decompressed (i.e., the adjustable nut 152 moves in the proximal direction), the biasing force of the second setting spring 148 decreases.

The first setting spring 142 can have a first spring rate or spring constant $k_1$, and the first setting spring 142 applies a first biasing force on the poppet 122 in the distal direction. Similarly, the second setting spring 148 can have a second spring constant $k_2$, and the second setting spring 148 also applies a second biasing force in the distal direction on the poppet 122 via the spring cap 150.

With the configuration of the counterbalance valve 100 shown in FIG. 1, the first setting spring 142 and the second setting spring 148 are disposed in parallel with respect to the poppet 122. As such, if the poppet 122 moves by a particular axial distance, the setting springs 142, 148 are deformed (e.g., compressed or decompressed) by the same axial distance. Further, the effective or equivalent biasing force acting on the poppet 122 is substantially the sum of the first and second biasing forces of the setting springs 142, 148. The term "substantially" is used to indicate that the equivalent biasing force may be slightly different than an absolute sum of the biasing forces due to tolerances and frictional forces between the setting springs 142, 148 and the surround surfaces. For instance, the equivalent force can be about 98% of a theoretical sum of the biasing forces.

Particularly, the combination of the first setting spring 142 and the second setting spring 148 being disposed in parallel has an equivalent or effective spring constant $k_{eq}$ that is equal to the sum of the spring constants $k_1$, $k_2$. Thus, the effective spring constant $k_{eq}$ can be determined as $k_1+k_2$.

The effective spring constant $k_{eq}$ determines a magnitude of the equivalent biasing force applied on the poppet 122 in the distal direction by way of the combined action of the setting springs 142, 148. In other words, the first setting spring 142 and the second setting spring 148 cooperate to apply an effective or equivalent biasing force on the poppet 122 in the distal direction. Such biasing force determines the pressure setting of the counterbalance valve 100, where the pressure setting is the pressure level of fluid at the first port 110 at which the counterbalance valve 100 can open to provide fluid to the second port 112.

Specifically, based on the equivalent spring constant $k_{eq}$ of the setting springs 142, 148 and their respective lengths, the setting springs 142, 148 exert a particular preload or biasing force on the poppet 122 in the distal direction, thus causing the poppet 122 to be seated at the seat 124 of the reverse flow piston 114. The pressure setting of the counterbalance valve 100 can be determined by dividing the biasing force that the setting springs 142, 148 apply to the poppet 122 by a circular area $A_1$ associated with a diameter of the distal portion of the poppet 122. The area $A_1$ is labelled in FIG. 1.

As an example for illustration, spring constants IQ can be about 322 pound-force per inch (lbs/in) providing a biasing force of about 67 lbs, and spring constant $k_2$ can be about 230 lbs/in providing a biasing force of about 35 lbs. Thus, the total or equivalent biasing force is about 102 lbs. If the diameter of the distal portion of the poppet 122 is about 0.17 inch, then the pressure setting of the counterbalance valve 100 can be about 4500 pounds per square inch (psi). As another example for illustration, if the diameter of the distal portion of the poppet 122 is about 0.14 inch, then the pressure setting of the counterbalance valve 100 can be about 6626 psi.

Thus, the equivalent biasing force of the setting springs 142, 148 determines the pressure setting of the counterbalance valve 100. One of the setting springs, namely the second setting spring 148, is adjustable by way of the adjusting pin 154 and the adjustable nut 152. By adjusting the length of the second setting spring 148, the biasing force of the second setting spring 148, and thus the equivalent biasing force can be adjusted to vary the pressure setting of the counterbalance valve 100 as desired.

The counterbalance valve 100 is configured to operate in different modes of operation. In a first mode of operation, the counterbalance valve 100 allows reverse flow from the second port 112 to the first port 110. In this mode of operation, pressurized fluid is received at the second port 112, and the counterbalance valve 100 allows fluid to flow from the second port 112 to the first port 110.

FIG. 4 illustrates a cross-sectional side view of the counterbalance valve 100 operating in a first mode of operation, in accordance with an example implementation. The fluid received at the second port 112 flows through the cross-holes 113A, 113B, and then applies a force on annular surface 400 of the reverse flow piston 114, thereby pushing the reverse flow piston 114 in the distal direction against the reverse flow check spring 120. For example, the annular surface 400 can have an area of about $A_2-A_1$ where $A_1$ and $A_2$ are labelled in FIG. 4 ($A_2$ is an area associated with a large diameter of the reverse flow piston 114 and $A_1$ is an area associated with a diameter of the distal portion of the poppet 122).

Once the force applied by the fluid received at the second port 112 on the annular surface 400 overcomes the force of the reverse flow check spring 120, the reverse flow piston 114 moves or is displaced in the distal direction. The poppet 122 does not follow the reverse flow piston 114 as the poppet 122 is precluded by moving in the distal direction by interaction of the first flange 130 and the spacer 128.

As a result of displacement of the reverse flow piston 114, a gap or flow area is formed between the reverse flow piston 114 and the poppet 122 as depicted in FIG. 4. As a result, the fluid received at the second port 112 flows through the flow area to the first port 110.

The counterbalance valve 100 can also operate in a second mode of operation that can be referred to as the pilot modulation mode of operation. In this mode of operation, when a pilot pressure fluid signal received at the pilot port 138 and the fluid received at the first port 110 cooperate to overcome the pressure setting of the counterbalance valve 100, the counterbalance valve 100 opens and fluid is allowed from the first port 110 to the second port 112.

Figure 5:
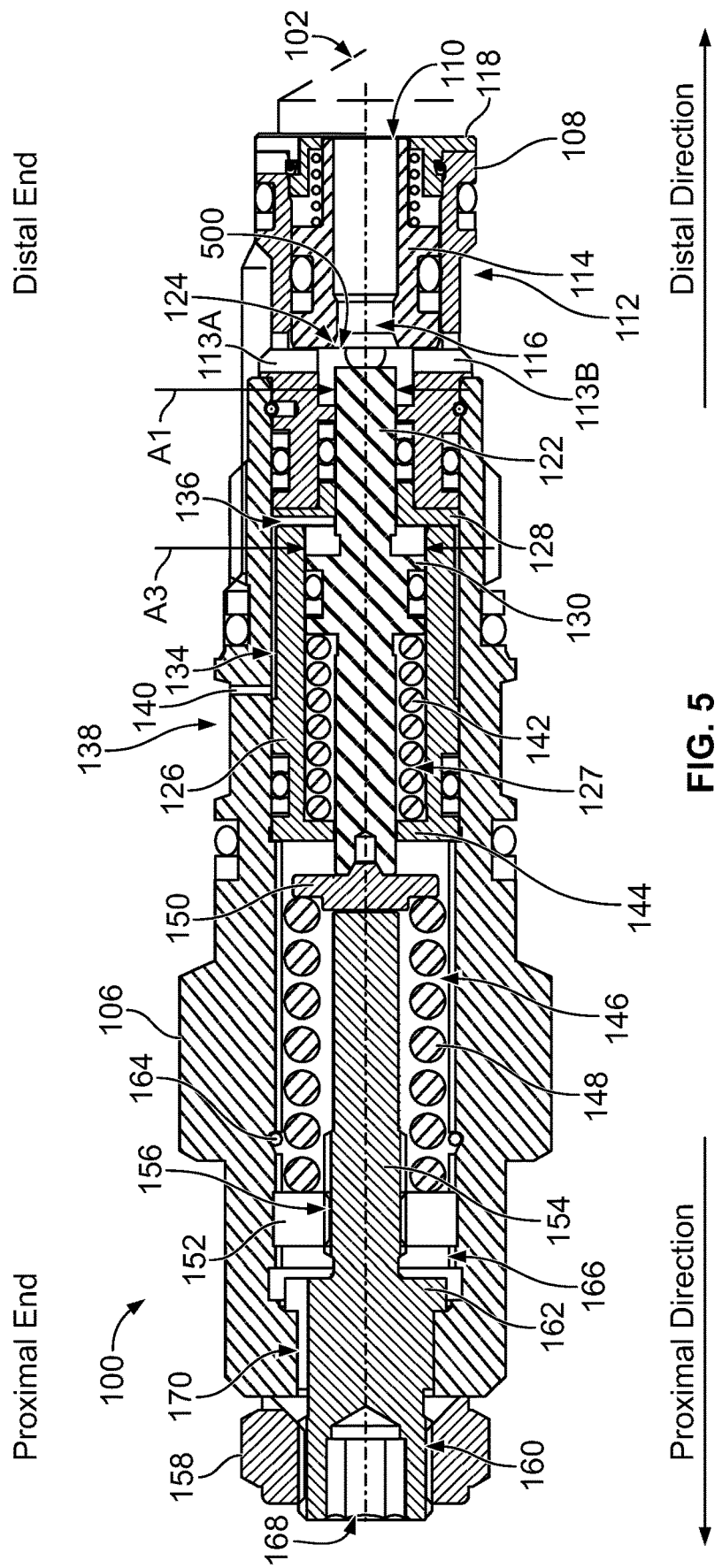
FIG. 5 illustrates a cross-sectional side view of a counterbalance valve operating in a second mode of operation, in accordance with an example implementation.

FIG. 5 illustrates a cross-sectional side view of the counterbalance valve 100 operating in a second mode of operation, in accordance with an example implementation. In FIG. 5, a circular area associated with a diameter of the first flange 130 of the poppet 122 is labelled $A_3$.

Pressurized fluid received at the first port 110 applies a first fluid force in the proximal direction on a circular surface area of a distal face or distal end of the poppet 122 having area $A_1$. Thus, the first fluid force can be determined as $(F_1=P_1 \cdot A_1)$, where $P_1$ is the pressure level of fluid at the first port 110.

Further, the pilot pressure fluid signal received at the pilot port 138 is communicated through the pilot cross-hole 140 and the annular groove 134 to the slot 136 of the spacer 128. The pilot pressure fluid signal communicated to the slot 136 applies a second fluid force in the proximal direction on the distal surface of the flange 130 of the poppet 122. Particularly, the pilot pressure fluid signal applies the force on an effective annular surface area that can be determined as $A_3-A_1$. Thus, the second fluid force can be determined as $F_2=P_p \cdot (A_3-A_1)$, where $P_p$ is the pressure level of the pilot pressure fluid signal.

As such, the forces from both the pressurized fluid received at the first port 110 and the pilot pressure fluid signal act on the poppet 122 in the proximal direction. When these forces overcome the equivalent biasing force of the setting springs 142, 148 on the poppet 122, the poppet 122 can move or is displaced in the proximal direction as depicted in FIG. 5.

Particularly, comparing FIG. 5 to FIG. 1, the flange 130 has moved proximally relative to the spacer 128 and the first setting spring 142 is compressed, and also the spring cap 150 has moved proximally and the second setting spring 148 is compressed. The first setting spring 142 and the second setting spring 148 are both compressed by an amount equal the axial distance that the poppet 122 has moved. As the setting springs 142, 148 are compressed, the biasing force they apply on the poppet 122 can increase.

The poppet 122 can move in the proximal direction to a particular axial position at which a substantial force equilibrium is achieved between the first fluid force and the second fluid force acting in the proximal direction and the equivalent biasing force of the setting springs 142, 148 acting in the distal direction. The term "substantial force equilibrium" is used to indicate that there might be other forces, e.g., frictional forces, that are minor and are not taken into consideration in the force equilibrium between the first fluid force and the second fluid force acting in the proximal direction and the equivalent biasing force of the setting springs 142, 148 acting in the distal direction.

As depicted in FIG. 5, the poppet 122 has moved off the seat 124, and thus a flow area 500 is formed between the reverse flow piston 114 and the poppet 122, where the size of the flow area 500 is based on the extent of axial movement of the poppet 122, i.e., based on the axial position at which the force equilibrium is achieved. As a result, the fluid received at the first port 110 flows through the flow area 500, then through the cross-holes 113A, 113B to the second port 112.

The counterbalance valve 100 can be characterized by two parameters: the pressure setting $P_{CBV}$ and the pilot ratio $P_R$. The pressure setting $P_{CBV}$ can also be referred to as the crack pressure of the counterbalance valve 100 and is determined as:

$$P_{CBV} = \frac{F_{CBV}}{A_1} \quad (1)$$

where $F_{CBV}$ is the equivalent force applied by the setting springs 142, 148 on the poppet 122 in the distal direction as described above (i.e., $F_{CBV}$ is equal to the sum of the biasing forces of the setting springs 142, 148).

The pilot ratio $P_R$ is determined as a ratio between the effective annular surface area $(A_3-A_1)$ on which the pilot pressure fluid signal acts divided by the surface area $A_1$ of the distal end face of the poppet 122. Thus, the pilot ratio $P_R$ is determined as $$P_R = \frac{A_3 - A_1}{A_1}.$$

In examples, the effective annular surface area $(A_3-A_1)$ is greater than the surface area $A_1$ and the pilot ratio can thus be greater than 1. In some applications, however, the areas can be equal and the pilot ratio can be equal to 1.

The pilot ratio $P_R$ determines how the pressure setting $P_{CBV}$ of the counterbalance valve 100 changes as the pilot pressure (i.e., the pressure level of the pilot pressure fluid signal at the pilot port 138) changes. As an example, a 3:1 pilot ratio indicates that an increase of, for example, 10 bar in the pilot pressure decreases the pressure setting $P_{CBV}$ by 30 bar.

With this configuration, the force that the pilot pressure fluid signal applies to the poppet 122 assists the pressurized fluid received at the first port 110 in overcoming the force $F_{CBV}$ applied to the poppet 122 in the distal direction by the setting springs 142, 148. In other words, the force that the pressurized fluid received at the first port 110 needs to apply to the poppet 122 to cause the poppet 122 to move axially in the proximal direction is reduced to a predetermined force value that is based on the pressure level of the pilot pressure fluid signal. As such, the force resulting from the pilot pressure fluid signal received at the pilot port 138 effectively reduces the pressure setting $P_{CBV}$ of the counterbalance valve 100, and a reduced pressure level at the first port 110 can cause the counterbalance valve 100 to open.

Notably, using two setting springs, i.e., the setting springs 142, 148, allows for increasing the equivalent spring force $F_{CBV}$. Based on equation (1), increasing $F_{CBV}$ for the same area $A_1$ can increase the pressure setting $P_{CBV}$ of the counterbalance valve 100 if desired. Alternatively, for the same pressure setting $P_{CBV}$, the area $A_1$ can be increased, thereby increasing the size of the flow area 500 and increasing the fluid flow rate through the counterbalance valve 100 from the first port 110 to the second port 112. As such, for a given size of the counterbalance valve 100, a larger fluid flow rate (i.e., a larger flow capacity) can be achieved.

The configuration of the counterbalance valve 100 efficiently uses the space available therein by placing the first setting spring 142 in the first chamber 127 and placing the second setting spring 148 in the second chamber 146. The longitudinal cylindrical cavity of the housing 106 comprises the first chamber 127 (particularly, the first chamber 127 is formed within the second sleeve 126) and the longitudinal cylindrical cavity of the housing 106 also comprises the second chamber 146, such that the chambers 127, 146 are axially-disposed in a staggered arrangement along a length of the housing 106. This way, the second chamber 146 is longitudinally-separated from the first chamber 127.

Conventional counterbalance valve typically use one setting spring. The spring constant of such setting spring is limited by the size of the chamber or space in which the setting spring is disposed. Other conventional counterbalance valves may use nested springs in the same chamber to increase the effective force. However, the spring constants of such nested springs are also limited by the size of the chamber in which they are disposed.

The counterbalance valve 100, however, utilizes the configuration of the space therein efficiently and comprises the first setting spring 142 and the second setting spring 148 being disposed in separate chambers (i.e., the first chamber 127 and the second chamber 146, respectively) in a parallel configuration to increase the equivalent biasing force. As mentioned above, such increase in the equivalent biasing force of the setting springs 142, 148 can increase the pressure setting $P_{CBV}$ of the counterbalance valve 100 and/or increase the flow capacity therethrough (i.e., increase the maximum fluid flow rate from the first port 110 to the second port 112).

Further, the first chamber 127 and the second chamber 146 are both vented to an external environment, i.e., vented to the atmosphere, of the counterbalance valve 100. Particularly, the counterbalance valve 100 comprises unsealed spaces between the shoulder 144 of the second sleeve 126 and the poppet 122. As such, the first chamber 127 is fluidly coupled to the second chamber 146. Further, the second chamber 146 is vented to the external environment of the counterbalance valve 100 through unsealed spaces between the adjustable nut 152 and the housing 106, between the adjustable nut 152 and the adjusting pin 154 at the threaded region 156, between the adjusting pin 154 and the housing 106 via slot 170, and between the nut 158 and the housing 106.

The counterbalance valve 100 can thus be referred to as a vented or atmospherically-referenced counterbalance valve. The counterbalance valve 100 can eliminate any unwanted trapped pressure in the first chamber 127 and the second chamber 146 by venting pressure through the slot 170 to the external environment.

With this configuration, the pressure level in the first chamber 127 and the second chamber 146 can be consistent and can be equal to atmospheric pressure. The pressure in the first chamber 127 and the second chamber 146 is a reference pressure against which the combined forces of fluid at the first port 110 and the pilot pressure fluid signal received from the pilot port 138 act. By acting against a consistent low pressure level (i.e., atmospheric pressure), the pressure setting of the counterbalance valve 100 can remain consistent. Such consistent pressure setting may be desired in several applications.

Figure 6:
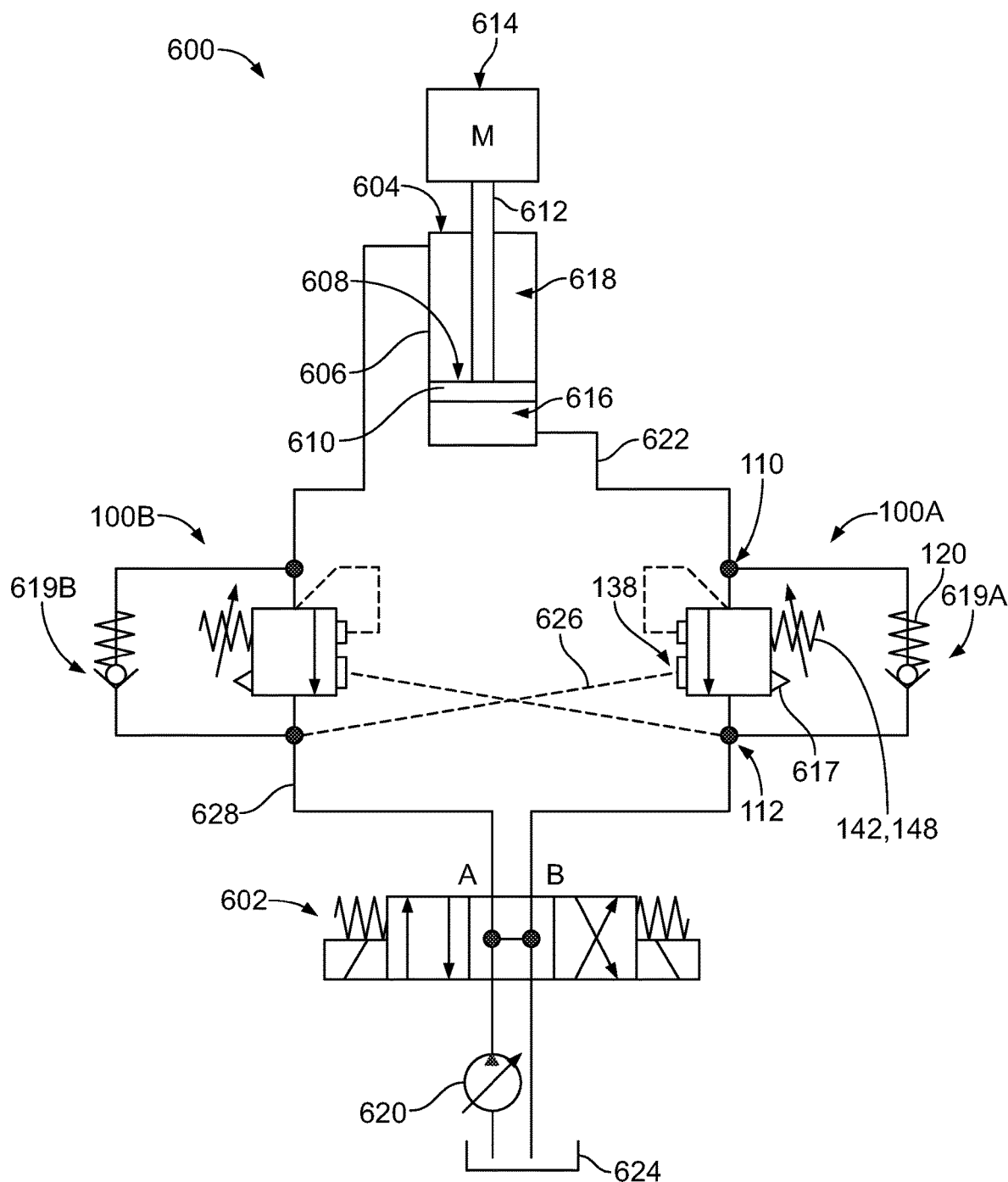
FIG. 6 illustrates a hydraulic system, in accordance with an example implementation.

FIG. 6 illustrates a hydraulic system 600, in accordance with an example implementation. The hydraulic system 600 includes a directional control valve 602 configured to control flow to and from an actuator 604. The actuator 604 includes a cylinder 606 and a piston 608 slidably accommodated in the cylinder 606. The piston 608 includes a piston head 610 and a rod 612 extending from the piston head 610 along a central longitudinal axis direction of the cylinder 606. The rod 612 is coupled to a load 614. The piston head 610 divides the internal space of the cylinder 606 into a first actuator chamber 616 and a second actuator chamber 618.

The hydraulic system 600 further includes two counterbalance valves 100A, 100B symbolically or schematically represented in FIG. 2 and they both represent the counterbalance valve 100 and have the same components of the counterbalance valve 100. Therefore, the components or elements of counterbalance valves 100A, 100B are designated with the same reference numbers used for the counterbalance valve 100 in FIGS. 1-5.

The first setting spring 142 and the second setting spring 148 are represented symbolically by a single equivalent spring in FIG. 6. The arrow drawn across the setting springs 142, 148 in FIG. 6 represents adjustability of the second setting spring 148 via the adjusting pin 154 and the adjustable nut 152 as described above. Although one of the two springs, i.e., the second setting spring 148, is adjustable, the equivalent biasing force can be changed by adjusting the second setting spring 148. Further, the first chamber 127 and the second chamber 146 being vented to the external environment of the counterbalance valve 100 is represented symbolically by triangles, such as triangle 617 of the counterbalance valve 100A.

The counterbalance valves 100A, 100B include respective check valves 619A, 619B that symbolically represent operations of the reverse flow piston 114 and the reverse flow check spring 120. Particularly, the check valves 619A, 619B allow reverse flow from the second port 112 to the first port 110 as the reverse flow piston 114 moves distally as described above with respect to FIG. 4.

In an example operation, the load 614 can be a negative load that acts with gravity. In this example operation, the direction control valve 602 can be actuated to direct fluid flow received from a source of pressurized fluid, such as a pump 620, through the check valve 619B of the counterbalance valve 100B, to the second actuator chamber 618 to lower the load 614. Without the counterbalance valve 100A, the weight of the load 614 can force fluid out of the first actuator chamber 616 causing the load to drop uncontrollably. Further, without the counterbalance valve 100A, fluid flow from the pump 620 might not be able to keep up with movement of the piston 608, causing cavitation in the second actuator chamber 618.

To avoid uncontrollable lowering of the load 614 and cavitation in the second actuator chamber 618, the counterbalance valve 100A is installed in a hydraulic line 622 leading from the first actuator chamber 616 to the directional control valve 602. Particularly, the first port 110 of the counterbalance valve 100A is fluidly coupled to the first actuator chamber 616, whereas the second port 112 of the counterbalance valve 100A is fluidly coupled to the directional control valve 602. The counterbalance valve 100A is configured to control or restrict fluid forced out of the first actuator chamber 616 and received at the first port 110. Fluid exiting the counterbalance valve 100A through the second port 112 then flows through the directional control valve 602 to a fluid reservoir 624. The fluid reservoir 624 can, for example, be configured to contain fluid at a low pressure level, e.g., atmospheric pressure level such as zero pounds per square inch (psi) or slightly higher (e.g., 70 psi).

A pilot line 626, tapped from a hydraulic line 628 connecting the directional control valve 602 to the counterbalance valve 100B, is fluidly coupled to the pilot port 138 of the counterbalance valve 100A. A pilot pressure fluid signal received through the pilot line 626 acts together with the pressure induced in the first actuator chamber 616 due to the load 614 against the equivalent biasing force generated by the settings spring 142, 148 of the counterbalance valve 100A as described above with respect to the second mode of operation (pilot modulation mode of operation) of the counterbalance valve 100. The combined action of the pilot pressure fluid signal and the induced pressure in the first actuator chamber 616 facilitates opening the counterbalance valve 100A to allow flow therethrough from the first port 110 to the second port 112.

As described above, because the pilot pressure fluid signal acts against the setting springs 142, 148, the pilot pressure fluid signal effectively reduces the pressure setting determined by a spring constants of the setting springs 142, 148. The extent of reduction in the pressure setting is determined by the pilot ratio $P_R$. For example, if the pilot ratio $P_R$ is 3 to 1 (3:1), then for each 10 bar increase in pressure level of the pilot pressure fluid signal, the pressure setting of the setting springs 142, 148 is reduced by 30 bar. As another example, if the pilot ratio is 5 to 1 (5:1), then for each 10 bar increase in the pressure level of pilot pressure fluid signal, the pressure setting of the setting springs 142, 148 is reduced by 50 bar.

If the piston 608 tends to increase its speed, pressure level in the second actuator chamber 618, the hydraulic line 628, and the pilot line 626 may decrease. As a result, the combined force acting against the setting springs 142, 148 is decreased, and the setting springs 142, 148 push the poppet 122 further in the distal direction to reduce the flow area 500. Thus, the counterbalance valve 100A restricts fluid flow therethrough and precludes the load 614 from dropping at large speeds (i.e., precludes the load 614 and the actuator 604 from overrunning).

The counterbalance valve 100B operates similar to the counterbalance valve 100A and is configured to control fluid flow forced out of the second actuator chamber 618 when the piston 608 is extending.

The hydraulic system 600 represents an example system in which the counterbalance valve 100 can be used. Other implementations are possible. For example, a different type of directional control valve can be used. In another example, the counterbalance valve 100A can be directly coupled to the fluid reservoir 624 as opposed to being coupled to the directional control valve, i.e., the second port 112 can be directly coupled to the fluid reservoir 624.

Figure 7:
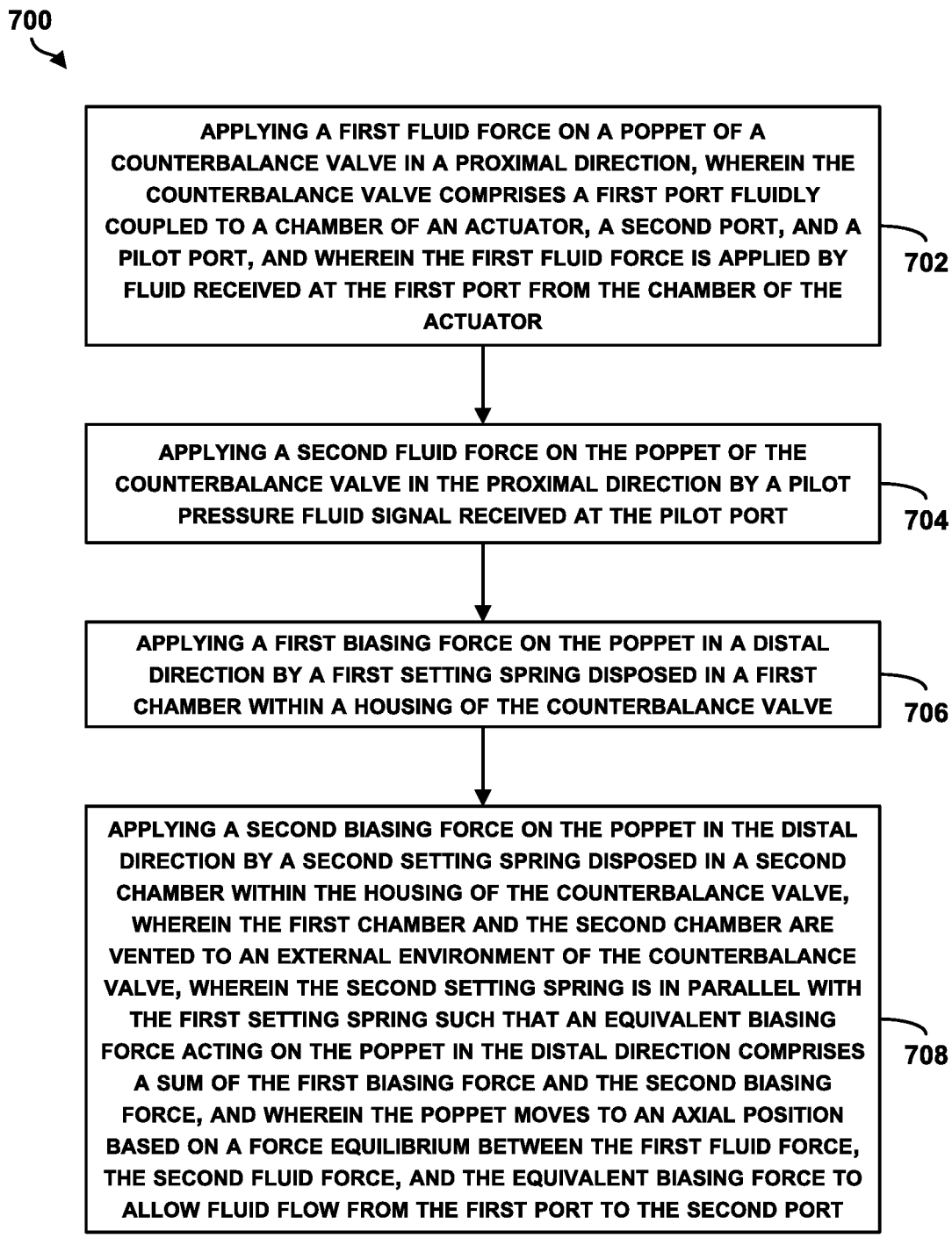
FIG. 7 a flowchart of a method for operating a counterbalance valve, in accordance with an example implementation.

FIG. 7 is a flowchart of a method 700 for operating the counterbalance valve 100, in accordance with an example implementation. The method 700 is an example method that can be used with the counterbalance valve 100 and the hydraulic system 600, for example.

The method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes applying a first fluid force on the poppet 122 of the counterbalance valve 100 in the proximal direction, wherein the counterbalance valve 100 comprises the first port 110 fluidly coupled to a chamber (e.g., the first actuator chamber 616) of the actuator 604, the second port 112, and the pilot port 138, and wherein the first fluid force is applied by fluid received at the first port 110 from the chamber of the actuator.

At block 704, the method 700 includes applying a second fluid force on the poppet 122 of the counterbalance valve 100 in the proximal direction by a pilot pressure fluid signal received at the pilot port 138.

At block 706, the method 700 includes applying a first biasing force on the poppet 122 in the distal direction by the first setting spring 142 disposed in the first chamber 127 within the housing 106 of the counterbalance valve 100.

At block 708, the method 700 includes applying a second biasing force on the poppet 122 in the distal direction by the second setting spring 148 disposed in the second chamber 146 within the housing 106 of the counterbalance valve 100, wherein the first chamber 127 and the second chamber 146 are vented to an external environment of the counterbalance valve 100, wherein the second setting spring 148 is in parallel with the first setting spring 142 such that an equivalent biasing force acting on the poppet 122 in the distal direction comprises a sum of the first biasing force and the second biasing force, and wherein the poppet 122 moves to an axial position based on a force equilibrium between the first fluid force, the second fluid force, and the equivalent biasing force to allow fluid flow from the first port to the second port.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A counterbalance valve comprising:
a plurality of ports comprising: a first port configured to be fluidly coupled to an actuator, a second port, and a pilot port configured to receive a pilot pressure fluid signal;
a poppet configured to be subjected to (i) a first fluid force by fluid received at the first port acting on the poppet in a proximal direction, and (ii) a second fluid force by the pilot pressure fluid signal received at the pilot port acting on the poppet in the proximal direction;
a first setting spring disposed in a first chamber and applying a first biasing force on the poppet in a distal direction; and
a second setting spring disposed in a second chamber and applying a second biasing force on the poppet in the distal direction, wherein the first chamber and the second chamber are vented to an atmospheric external environment of the counterbalance valve, wherein the second setting spring is in parallel with the first setting spring such that an equivalent biasing force acting on the poppet in the distal direction comprises substantially a sum of the first biasing force and the second biasing force, and wherein the poppet is configured to move to an axial position based on a substantial force equilibrium between the first fluid force, the second fluid force, and the equivalent biasing force to allow fluid flow from the first port to the second port.

2. The counterbalance valve of claim 1, further comprising:
a housing comprising the pilot port; and
a sleeve fixedly disposed in the housing, wherein the sleeve comprises the first port and the second port, wherein the poppet is partially disposed in the sleeve and is slidably accommodated therein.

3. The counterbalance valve of claim 2, wherein the sleeve is a first sleeve, and wherein the counterbalance valve further comprises:
a second sleeve fixedly disposed in the housing, wherein the second sleeve comprises the first chamber having the first setting spring therein.

4. The counterbalance valve of claim 3, wherein the first chamber comprises an annular chamber formed between an exterior surface of the poppet and an interior surface of the second sleeve, wherein the first setting spring is disposed in the annular chamber about a portion of the exterior surface of the poppet.

5. The counterbalance valve of claim 3, further comprising:
a spacer interposed between the first sleeve and the second sleeve, wherein the spacer includes a slot configured to receive the pilot pressure fluid signal from the pilot port, allowing the pilot pressure fluid signal to apply the second fluid force on the poppet.

6. The counterbalance valve of claim 1, further comprising:
a reverse flow piston disposed at the first port and configured to move axially; and
a reverse flow check spring that biases the reverse flow piston toward the poppet, such that the reverse flow piston operates as a seat for the poppet when the counterbalance valve is closed, wherein the reverse flow piston is configured to move in the distal direction against the reverse flow check spring to allow fluid flow from the second port to the first port.

7. The counterbalance valve of claim 6, further comprising:
a sleeve comprising the first port and the second port, wherein the reverse flow piston is disposed in the sleeve and is slidably accommodated therein; and
a ring-shaped member disposed at a distal end of the reverse flow piston, wherein the ring-shaped member supports the reverse flow check spring, wherein the ring-shaped member is coupled to the sleeve via a wire ring, and wherein the ring-shaped member comprises a slot that facilitates access to the wire ring.

8. The counterbalance valve of claim 1, further comprising:
an adjustable nut interfacing with the second setting spring; and
an adjusting pin threadedly engaged with the adjustable nut such that rotating the adjusting pin causes the adjustable nut to move axially and change a length of the second setting spring, thereby changing the second biasing force and the equivalent biasing force acting on the poppet in the distal direction.

9. The counterbalance valve of claim 8, further comprising:
a housing having a longitudinal slot configured to guide the adjustable nut longitudinally and preclude the adjustable nut from rotating as the adjusting pin rotates.

10. The counterbalance valve of claim 1, wherein the pilot pressure fluid signal acts on an annular surface area of the poppet, wherein fluid received at the first port acts on a surface area of a distal end of the poppet, and wherein the annular surface area is greater than the surface area of the distal end of the poppet.

11. The counterbalance valve of claim 1, further comprising:
a housing;
a first sleeve fixedly disposed in the housing; and
a second sleeve fixedly disposed in the housing and longitudinally-separated from the first sleeve, wherein the poppet is partially disposed in the first sleeve and partially disposed in the second sleeve and is slidably accommodated therein, wherein the second sleeve comprises the first chamber, and wherein the housing comprises the second chamber such that the second chamber is longitudinally-separated from the first chamber.

12. A hydraulic system comprising:
a source of fluid;
a fluid reservoir;
an actuator having a first actuator chamber and a second actuator chamber;
a directional control valve configured to direct fluid flow from the source of fluid to the second actuator chamber via a fluid line; and a counterbalance valve having a first port fluidly coupled to the second actuator chamber, a second port fluidly coupled to the fluid reservoir, and a pilot port fluidly coupled to the fluid line and configured to receive a pilot pressure fluid signal therethrough, wherein the counterbalance valve comprises:
  a poppet configured to be subjected to (i) a first fluid force by fluid received at the first port acting on the poppet in a proximal direction, and (ii) a second fluid force by the pilot pressure fluid signal received at the pilot port acting on the poppet in the proximal direction,
  a first setting spring disposed in a first chamber and applying a first biasing force on the poppet in a distal direction, and
  a second setting spring disposed in a second chamber and applying a second biasing force on the poppet in the distal direction, wherein the first chamber and the second chamber are vented to an atmospheric external environment of the counterbalance valve, wherein the second setting spring is in parallel with the first setting spring such that an equivalent biasing force acting on the poppet in the distal direction comprises substantially a sum of the first biasing force and the second biasing force, and wherein the poppet is configured to move to an axial position based on a substantial force equilibrium between the first fluid force, the second fluid force, and the equivalent biasing force to allow fluid flow received at the first port from the second actuator chamber to the second port that is fluidly coupled to the fluid reservoir.

13. The hydraulic system of claim 12, wherein the counterbalance valve further comprises:
  a housing comprising the pilot port;
  a first sleeve fixedly disposed in the housing, wherein the first sleeve comprises the first port and the second port; and
  a second sleeve fixedly disposed in the housing and longitudinally-separated from the first sleeve, wherein the poppet is partially disposed in the first sleeve and partially disposed in the second sleeve and is slidably accommodated therein, wherein the second sleeve comprises the first chamber, and wherein the housing comprises the second chamber such that the second chamber is longitudinally-separated from the first chamber.

14. The hydraulic system of claim 13, wherein the first chamber comprises an annular chamber formed between an exterior surface of the poppet and an interior surface of the second sleeve, wherein the first setting spring is disposed in the annular chamber about a portion of the exterior surface of the poppet.

15. The hydraulic system of claim 13, wherein the counterbalance valve further comprises:
  a spacer interposed between the first sleeve and the second sleeve, wherein the spacer includes a slot configured to receive the pilot pressure fluid signal from the pilot port, allowing the pilot pressure fluid signal to apply the second fluid force on the poppet.

16. The hydraulic system of claim 13, wherein the counterbalance valve further comprises:
  a reverse flow piston disposed at the first port and configured to move axially;
  a reverse flow check spring that biases the reverse flow piston toward the poppet, such that the reverse flow piston operates as a seat for the poppet when the counterbalance valve is closed, wherein the reverse flow piston is configured to move in the distal direction against the reverse flow check spring to allow fluid flow from the second port to the first port; and
  a ring-shaped member disposed at a distal end of the reverse flow piston, wherein the ring-shaped member supports the reverse flow check spring, wherein the ring-shaped member is coupled to the first sleeve via a wire ring, and wherein the ring-shaped member comprises a slot that facilitates access to the wire ring.

17. The hydraulic system of claim 12, wherein the counterbalance valve further comprises:
  an adjustable nut interfacing with the second setting spring; and
  an adjusting pin threadedly engaged with the adjustable nut such that rotating the adjusting pin causes the adjustable nut to move axially and change a length of the second setting spring, thereby changing the second biasing force and the equivalent biasing force acting on the poppet in the distal direction.

18. The hydraulic system of claim 17, wherein the counterbalance valve further comprises:
  a housing having a longitudinal slot configured to guide the adjustable nut longitudinally and preclude the adjustable nut from rotating as the adjusting pin rotates.

19. A method comprising:
  applying a first fluid force on a poppet of a counterbalance valve in a proximal direction, wherein the counterbalance valve comprises a first port fluidly coupled to a chamber of an actuator, a second port, and a pilot port, and wherein the first fluid force is applied by fluid received at the first port from the chamber of the actuator;
  applying a second fluid force on the poppet of the counterbalance valve in the proximal direction by a pilot pressure fluid signal received at the pilot port;
  applying a first biasing force on the poppet in a distal direction by a first setting spring disposed in a first chamber within a housing of the counterbalance valve; and
  applying a second biasing force on the poppet in the distal direction by a second setting spring disposed in a second chamber within the housing of the counterbalance valve, wherein the first chamber and the second chamber are vented to an atmospheric external environment of the counterbalance valve, wherein the second setting spring is in parallel with the first setting spring such that an equivalent biasing force acting on the poppet in the distal direction comprises substantial a sum of the first biasing force and the second biasing force, and wherein the poppet moves to an axial position based on a substantial force equilibrium between the first fluid force, the second fluid force, and the equivalent biasing force to allow fluid flow from the first port to the second port.

20. The method of claim 19, wherein the counterbalance valve further comprises an adjustable nut interfacing with the second setting spring, wherein the method further comprises:
  moving the adjustable nut axially to change a length of the second setting spring, thereby changing the second biasing force and the equivalent biasing force acting on the poppet in the distal direction.

* * * * *